United States Patent Office 3,453,862
Patented July 8, 1969

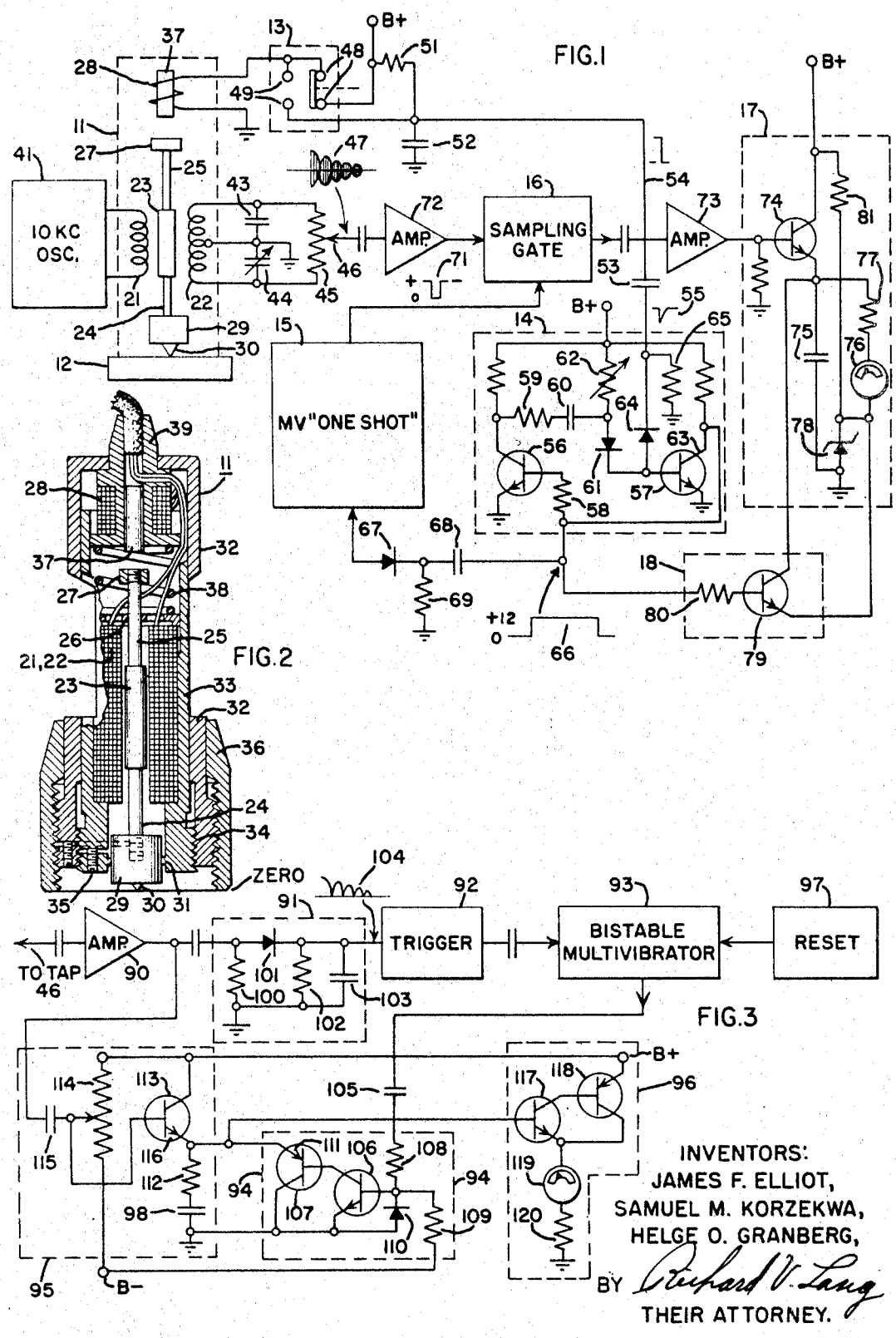

3,453,862
APPARATUS FOR MEASURING SOME MECHANICAL PROPERTIES OF A MATERIAL
James Franklin Elliott, Syracuse, Samuel M. Korzekwa, Baldwinsville, and Helge O. Granberg, North Syracuse, N.Y., assignors to General Electric Company, a corporation of New York
Filed Mar. 6, 1967, Ser. No. 620,801
Int. Cl. G01n 3/52
U.S. Cl. 73—12      14 Claims

ABSTRACT OF THE DISCLOSURE

Apparatus capable of measuring the hardness and quantities relating to the ultimate tensile strength, the yield point, and the strainless hardness is herein disclosed. This apparatus comprises an indenter adapted to impact upon a hard material and to rebound a measured amount. A linear variable differential transformer is integrally associated with the indenter and with the aid of auxiliary circuit provisions measures the initial drop height and the first rebound. A wide range of indenter tip pressures may be applied by this apparatus, and a wide range of bounce heights detected down to extremely small ones. The apparatus is thus capable of measuring properties over a wide range and of taking readings with a minimum of material damage.

BACKGROUND OF THE INVENTION

Field of the invention

The invention relates to test apparatus for making hardness measurements and evaluating ultimate tensile strength, the yield point, and the strainless hardness.

Description of the prior art

The Shore Schleroscope in which an indenter is allowed to fall and the rebound height measured is related in principle to the present invention. The tip pressures generated in the Shore instrument exceeded that required for full plastic flow, and only hardness was measured. The heights and the masses employed produced large deformations of the surface, and the method of measurement of the heights was relatively crude.

SUMMARY OF THE INVENTION

It is accordingly an object of the present invention to provide an improved hardness measuring apparatus.

It is a further object of the invention to provide a novel apparatus capable of measuring ultimate hardness, and quantities related to the ultimate tensile strength, the yield point, and the strainless hardness.

It is a further object of the present invention to provide an improved material property measuring apparatus of the Schleroscopic type producing an accurate electrical output.

It is a further object of the present invention to provide an improved material property measuring apparatus that is small and portable, convenient, and which produces a minimum damage to the material being measured.

These and other objects of the invention may be achieved in accordance with the invention in a novel material testing apparatus having a small portable support member adapted to be placed on the surface of the material, and including a linear variable transformer attached to the support member and having a predetermined linear range of measurement as its core is displaced. A pointed indenter is provided affixed to the displaceable transformer core, which is adapted to produce deformative impacts at drop heights lying within the linear range of measurement of the transformer. In accordance with the other aspects of the invention, a convenient three element adjusting support is described permitting convenient nulling of the transformer when the probe is on the surface and adjustment of the drop height. In accordance with additional aspects of the invention two operating circuits are provided for directly measuring the height of the first rebound, and indicating the height or the material property that the height signifies.

BRIEF DESCRIPTION OF THE DRAWING

The novel and distinctive features of the invention are set forth in the claims appended to the specification. The invention itself, however, together with the further objects and advantages thereof may best be understood by reference to the following description and accompanying drawings in which:

FIGURE 1 is a schematic illustration of a first embodiment of the invention for making a hardness measurement;

FIGURE 2 is a second illustration of the probe employed in the first and second embodiments, this illustration being intended to emphasize the mechanical features of said probe; and FIGURE 3 is a schematic illustration of a second embodiment incorporating a second form of electronic circuitry for making a hardness measurement.

DESCRIPTION OF THE PREFERRED EMBODIMENTS

Referring now to FIGURE 1, the first embodiment of the invention for making a simple hardness measurement is shown. It has as one of its principal components a LVDT probe 11, including an indenter (29, 30) adapted to be dropped to impace upon a sample material 12 under the control of controller 13. The position of the indenter during fall and rebound is continuously monitored by the linear variable differential transformer (21, 22, 23), a component of said probe assembly. The controller 13 also initiates the taking of a measurement.

The additional circuitry in FIGURE 1 takes part in electrically measuring the height of the first rebound after the indenter has fallen. This circuitry includes a first multivibrator 14 whose input is coupled to the operating controller 13; a second multivibrator 15 which has its input coupled to the output of the first multivibrator 14; a sampling gate 16, controlled by the multivibrator 15, interposed in the path coupling the probe 11 output to a meter circuit 17; the meter circuit 17 and, finally, a meter discharge circuit 18 coupled to the multivibrator 14. The foregoing components, as will subsequently be described in detail, participate in discharging the meter circuit in preparation for taking reading and in sampling the output of the probe during a period that the indenter is rebounding through its first peak position.

Considering now the foregoing embodiment in greater detail, the electrical circuit of probe 11 is best illustrated in FIGURE 1 while the mechanical details are best illustrated in FIGURE 2. The linear variable differential transformer consists of a primary or excitation winding 21, a carefully balanced center tapped secondary winding 22, both windings being arranged about the axially movable elongated cylindrically shaped positioning core member 23. The positioning core member 23 is of a high permeability magnetic alloy. Its axial position differentially influences the coupling between the primary winding 21 and the upper and lower halves of the tapped secondary winding 22. The positioning core is provided with axially extending nonmagnetic supporting shafts 24 and 25 which pass outwardly of the field region of the windings 21 and 22. The core 23 and its shafts 24 and 25 form integral components of the indenter. The linear variable differential transformer formed of components 21, 22, 23, 24 and 25 is capable of sensing small displacements as small as 0.0001 inch. In operation, it produces an alternating output voltage which increases linearly from a null value as the core is displaced up or down from a reference or "null" position. Its range of linearity on one side of null is typically 0.250 inch, and may be larger or smaller.

Continuing now a detailed description of the indenter of the probe 11, the upper shaft 25 supporting the core member 23 passes through an upper bearing 26 typically of Teflon and loosely fitting. The upper extremity of the shaft 25 bears a soft iron pick-up core member 27. The lower shaft 24 bears a somewhat more massive member 29 having a conical point 30 on its under surface which forms the indenting tip of the indenter. The member 29 is of generally cylindrical construction and is arranged to pass through a lower bearing assembly 31, loosely fitted and typically of Teflon. The mass of member 29 is selected to augment the pre-existent mass in the members 23, 24, 25 and 27 to the desired value suitable for making the hardness measurement. The conical point 30 on the under surface thereof is provided with a point of predetermined radius and is of a material which is relatively hard with respect to any material under test. It is securely fastened to the member 29.

The last major component contained within the LVDT probe 11 is a solenoid 28, 37, arranged in the upper portion of the probe. It includes a coil 28 and a soft iron core 37. When suitably energized the solenoid is adapted to suspend the indenter by the field it induces in the indenter pick-up core member 27. The under surface of the solenoid core 37 forms the upper stop for the indenter.

The probe 11 is housed in a generally cylindrical case 32 having two large lateral openings. The case permits two adjustments to be made—the drop height of the indenter and a zero adjustment of the electrical output when the tip 30 of the indenter is resting on the surface of the material being tested. The solenoid 28 is secured to the upper portion of the case 32 and is thus fixed with respect to it. The differential transformer windings are supported within an inner sleeve member 33 which is threaded into the case 32. The sleeve 33 has a knurled outer surface which is exposed through the lateral openings of the case 32 to permit adjustment. The threads between the case 32 and the sleeve 33 are shown at 34 and are provided with locking means at 35 for preventing unintentional rotation of the inner sleeve member 33. The locking means 35 comprises a radial slot spaced close to the lower extremity of the inner sleeve member 33, and a set screw threaded into the lower extremity. Rotation of the set screw axially distends the portion of the sleeve member below the slot and locks the threads 34. Rotation of the sleeve member 33 elevates (or lowers) the windings of the differential transformer within the case 32 and reduces (or increases) the distance between the stop 37 and the indenter null position in the differential transformer. This adjustment is used ot set the drop height. Ordinarily it is on the order of 0.050 inch.

The zero adjustment is provided by means of an annular ring 36 threaded upon the case 32. When the probe 11 is set down upon the sample to be studied, the under surface of the member 36 supports the probe assembly. The point 30 of the indenter, which may extend below the under surface of the ring 36, is then forced upwardly until it is coplanar with it, as it engages and is supported upon the surface of the sample. Rotation of the annular ring 36 thus elevates or lowers the probe assembly relative to the indenter which is supported by its tip 30 upon the sample surface. Ordinarily the annular ring 36 is adjusted to produce a null in the electrical output of the probe with the indenter in surface contact.

When the LVDT output is nulled with the indenter lying upon the surface of the sample, the LVDT output, which should vary linearly with the height of the indenter, then directly measures the height of the indenter relative to that surface. Since the drop height, typically 0.050 inch, is substantially less than the 0.250 inch which the LVDT is capable of measuring linearly, the LVDT is linear throughout and may be used to measure all distances that are of interest, including the initial drop height and the height of the first rebound.

The coiled compression spring 38 maintains the solenoid 28 and the windings of the LVDT in mutually fixed relationships once they have been adjusted. A bushing 39 is provided in the upper extremity of the probe for coupling away the electrical connections to the windings 21 and 22 of the LVDT and the solenoid 28, 37.

A more detailed description of the circuit in FIGURE 1 will now be undertaken. The exciter winding 21 of the LVDT probe 11 is coupled to a source 41 of alternating current energy. Typically the source 41 is an oscillator operating at 10 kc. with a stable amplitude of about 10 volts. The tapped secondary winding 22 has its center tap connected to ground, and each winding-half separately shunted by capacitors 43 and 44, respectively. Preferably one of the capacitors is variable. The secondary winding is finally shunted by a resistance 45 having a variable tap 46 from which an alternating current output is taken. Adjustment of the tap 46 and variable capacitor 44 effects a final zero adjustment in the presence of slight inaccuracies in the manufacture of the LVDT and sundry circuit strays. The output from the tap 46 is illustrated at 47. Assuming that the probe has been released and is falling and rebounding to a decaying rest position, the output at the tap is modulated carrier. The carrier is at 10 kc., the frequency of the oscillator 41, and its amplitude depicts the instantaneous height of the indenter as it proceeds through these motions. Since the periods between bounces is typically less $\frac{1}{100}$ of a second, the carrier which is of 100 times higher frequency is quite adequate to convey accurate positional information.

The initiation of the fall of the indenter is produced by the controller 13. The controller may take the form of push-button control having a pair of normally closed contacts 48 and a pair of normally open contacts 49. The winding of the solenoid 28 is coupled in series with the normally closed contacts 48 between a B+ source and ground. Pushing the button interrupts the flow of current through the solenoid and releases the holding action exerted on the pick-up core 27 of indenter. The indenter falls.

As the controller 13 is actuated, the normally open contacts 49 are closed initiating the taking of the measurement by the associated circuit. One of the normally open contacts 49 is coupled through a resistance 51 to a source of positive potential. This same contact is also coupled to ground by a storage capacitor 52 and through a differentiating capacitor 53 to the input circuit to the multivibrator 14. The other normally open contact 49 is led to ground through the relatively-low impedance solenoid winding. It may be seen that the capacitor 52 normally assumes a positive charge, reaching a potential close to that of the B+ source. When controller 13 is actuated, the capacitor 52 is rapidly discharged to ground potential, and the negative going transient is differentiated in the capacitor 53 to produce a negative going spike 55 at the input of multivibrator 14.

The multivibrator 14 is of essentially conventional design of the "one shot" variety. It consists of a pair of transistors 56 and 57 with their emitters "common" and directly grounded. Both collectors are coupled to a source of B+ potentials through suitable load resistances. Cross coupling between the collector 63 of transistor 57 and the base of transistor 56 is provided by the resistance 58. Coupling between the collector of transistor 56 and the base of transistor 57 is provided by the resistor 59, the capacitor 60, and the diode 61 all connected in series. The junction of the diode 61 and capacitor 60 are led through a variable resistance 62 to B+, and the diode is poled to set the transistor 57 into a normally on condition. The collector 63, therefore, normally is at near ground potential. The output of the multivibrator 14 is taken from collector 63.

The input circuit of the multivibrator 14 comprises a diode 64 coupled between capacitor 53 and the base of transistor 57, and poled to pass negative going pulses. A discharge path of capacitor 53 is provided by the resistance 65 coupled between the junction of capacitor 53 and the diode 64 and ground. Thus when the negative going spike 55 appears at the input to the multivibrator 14, it is passed to the base of transistor 57, where it turns the transistor 57 off. The cross coupling connection of the collector 63 to the base of transistor 56 turns transistor 56 on and the A.C. coupling back to the base of transistor 57 tends to hold transistor 57 in an off condition. The capacitor 60, prior to the turning on of transistor 56, has both terminals near B+ potential and carries little charge. When transistor 56 is turned on, the nearest terminal of the capacitor is effectively grounded, and potential of the remote terminal plummets down toward ground, thus preventing transistor 57 from reconducting until capacitor 57 is charged through resistance 62 to a positive value adequate to turn transistor 57 back on. The output wave form of the multivibrator 14 is accordingly a positive going pulse as illustrated at 66, whose duration is typically 10 milliseconds, and which is adjustable by adjustment of the variable resistance 62. Ordinarily the time is set to be slightly less than the time required for the indenter to fall and rebound to its next peak position.

The multivibrator 15 may be of generally similar design to that of multivibrator 14, being of the "one shot" variety but produces an output pulse of shorter duration—typically a few milliseconds. It is selected to operate in response to a negative going pulse. Its output varies between a B+ value and ground, normally assuming a B+ value. Its input is coupled through diode 67, in series with differentiating capacitor 69 to the output of multivibrator 14. The junction of diode 67 and capacitor 68 are connected to ground through resistance 69. Together the elements 67, 68 and 69 permit the negative going trailing edge of the pulse 66 generated in multivibrator 14 to be coupled to multivibrator 15, and it fires at just prior to the moment that the indenter is at peak position. Firing takes its normal B+ output to zero as shown at 71. The duration of the pulse 71 should commence just prior to and terminate just after the peak in wave form 47.

The sampling gate 16 is of conventional design, adapted to prevent signals from passing when a B+ potential is applied to its control input, and adapted to permit signals to pass when a zero control potential is applied. Accordingly, the connection of the multivibrator 15 output to it, opens the gate for the duration of its output pulse.

The remaining connections between the probe 11 and the meter circuit 17 may now be described. The tap 46 containing the modulated output signal 47 of the LVDT probe is coupled to a first buffer amplifier 72, and next to the sampling gate 16.

The sampling gate is opened for a short interval set to coincide with the period that the indenter passes the first rebound peak position. A short burst of 12 kc. signal of an amplitude slightly dependent on the rebound height of the indenter is then coupled to a second amplifier 73, and thence it is coupled to the peak detecting meter circuit 17. The peak detector comprises a transistor, connected in base input, emitter common configuration with conventional D.C. connections. The emitter is coupled to ground through a large storage capacitor 75. A microammeter 76, a resistance 77, a Zener diode 78, all in series, shunt the capacitor 75. A separate resistor 79 going to B+ supplies the Zener.

The time constants of the meter circuit 17 are selected to charge the meter circuit to approximately full value within the duration of the signal, and to sustain a reading in the meter for the several seconds that would be required for an observer to take a reading. It will read the peak value of the wave form during the sampling interval.

Since the time constants of the meter circuit are quite long (as well as in the general intersects of accuracy) it is desirable that the capacitor 75 be discharged below the second rebound prior to taking a reading. This is achieved by the discharge circuit 18 including a transistor 79, having its emitter electrode coupled to the positive terminal of the Zener diode 78 and its collector to the ungrounded terminal of the capacitor 75. The base of transistor 79 is coupled through resistance 80 to the output of the multivibrator 14. It may be noted that when the output of multivibrator 14 remains at its normal near zero value that transistor 79 is held off. When multivibrator 14 fires initiating pulse 66, transistor 79 becomes conductive and proceeds to discharge the capacitor 75 to the value of the Zener diode 78. When the pulse 66 terminates, the transistor 79 becomes nonconducting—as the signal to open the sampling gate 16 enters the multivibrator 15.

The foregoing circuit thus provides means for reading the maximum height of the first rebound of the indenter which is a necessary element in measurement of the Shore hardness number of the material. The initial drop height may be measured by the same equipment by retaining the probe in its uppermost position against the stop (as by inverting it in the hand) and taking a second reading. The ratio is the Shore hardness number. Since the initial weight may be predetermined, the meter may be direct reading, as by introducing a suitable scale factor.

In making the measurement it is essential that full plastic flow be achieved if the Shore hardness number is to be obtained. This requires that the variables exceed the ultimate tensile strength of the material. Typically, the total mass impelling the indenter is of 1 to 4 grams; the tip diameter is on the order of 0.010 inch for harder samples, and 0.125 inch for softer samples.

The same measurement may also be achieved by a quite different circuit. It is illustrated in FIGURE 3, having its input arranged for connection to the tap 46 on the probe nulling resistance 45. It has as its principal components an input amplifier 90, an envelope detector 91, having a time constant set to follow the envelope of the LVDT output wave form, a trigger 92 typically of Schmitt design adapted to fire at near null output of detector 91, a bistable multivibrator 93 coupled to the output of the trigger 92. A manual reset control 97 is provided to reset the multivibrator 93 for each reading. The multivibrator 93 output is fed to a discharge circuit 94, which discharges a peak detector circuit 95. The signal is continuously fed to the peak detector 95, which has a long time constant holding to whatever peak value it has fed. The meter circuit is shown at 96.

The circuit configuration and its operation may now be treated in detail. Releasing the indenter by operation of the controller 13 causes the probe indenter to start to fall, and the envelope of the output wave form 47 quickly descends to near zero. (While the peak detector 95 may have sensed this value and begun to charge the capacitor 98 in its emitter lead, other events are intervening to discharge it.)

The envelope detector 91, consists of a series diode 101, a grounded input resistor 100, a grounded load resistor 102, the latter resistor being shunted by capacitor 103. The output of the envelope detector is shown at 104. By virtue of the null adjustment of the probe on the surface, the output of the envelope detector reaches a null when the probe indenter strikes the surface of the sample 12. The trigger 92 is set to "fire" when its input coupled to null detector 91 reaches near zero potential, and it generates an output pulse, which is coupled to the bistable multivibrator 93, causing it to fire. The output pulse of the multivibrator 93 is coupled through capacitor 105 to the discharge circuit 94.

The discharge circuit is seen to consist of a pair of interconnected transistors 106, 107, resistances 108, 109 and a diode 110. The capacitor 105 is coupled to the base of transistor 106 through resistance 108, resistance 109, also coupled to this base, being connected to a source of negative bias potential. The emitter of transistor 106 is grounded for biasing the transistor to be normally nonconductive. A protective diode 110 shunts the input junction of transistor 106. Transistor 107 has its base coupled to the collector of transistor 106 and its collector grounded. Its emitter electrode 111 is connected through current limiting resistance 112 to one terminal of the storage capacitor 98. The remote terminal of capacitor 98 is grounded. By virtue of the cascaded control connections and other biasing provisions, transistor 107 is normally off, becoming nonconductive with transistor 106. When transistor 107 does conduct it discharges capacitor 98 to near ground potential. Since the turn-on pulse applied through capacitor 105 occurs at or near the moment of impact of the indenter, as previously pointed out, the capacitor 98 is discharged at that moment to well below any value that it is likely to achieve as it is recharged to a higher value corresponding to the rebound voltage.

The charging circuit 95 consists of the transistor 113, bias adjusting tapped resistance 114, coupling capacitor 115, and the previously recited capacitor 98 and resistance 112. The signal 47, which is an amplitude modulated carrier, amplified in 90 is coupled by coupling capacitor 115 to the base of transistor 113. The emitter 116 of transistor 113 is coupled through resistance 112 to the ungrounded terminal of capacitor 98. The collector of transistor 113 is coupled to a positive source of bias potentials. The base of transistor 113 is also coupled to the tap of a resistance shunting the positive and negative bias sources. This tap is adjusted for input signal rectification and is offset slightly to reduce the error in bias that may occur due to voltage drop in the input junction.

As so designed, the circuit, discharged in the vicinity of the null to a value beneath the first rebound value, commences to rectify the input signal and to charge the capacitor 98. Charging continues until the peak of the first rebound occurs, and the voltage stored closely approximates that peak value. When the input voltage falls below the value stored in the capacitor 98, the transistor 113 ceases to conduct, since the input junction is now reversely biased, and the capacitor 98 retains its charge.

The meter circuit 96 then reads the voltage stored on the capacitor 98. The meter circuit consists of a pair of transistors 117, 118, a microammeter 119 and a resistance 120. The base of transistor 117 is D.C. coupled to the emitter 116 of transistor 113, and its collector is connected to the base of transistor 118. The emitter of transistor 118 is coupled to a source of positive bias potentials. The emitter of transistor 117 and the collector of transistor 118 are joined and connected through the microammeter 119 and resistance 120 in series with the microammeter, to ground. The transistors 117, 118 thus provide a simple voltage amplification function which with a minimum of current drain permits the meter 119 to measure the voltage stored in capacitor 98. The total circuit shunting the capacitor 98 is basically a high impedance circuit, once the capacitor is charged, and with a medium sized capacitor a time constant on the order of several minutes is readily achieved, permitting the observer ample time to take a reading from the meter 119.

It may be observed that while the equipment may be readily used to obtain the Shore hardness number with the material in full plastic flow, the drop height and other parameters may be adjusted to exert a pressure just exceeding that corresponding to the yield point of the material. At this point the height ratio becomes the "strainless hardness."

One may also "map" the properties of the material, as by successively reducing the initial drop height of the indenter through a first region in which full plastic flow occurs (where the height ratio gives the Shore hardness number), through a second transitional region that terminates with the yield point of the material, and finally into a third region of elastic collisions. The initial region of full plastic flow is characterized by a lower and nearly constant ratio $h_n/h_{n-1}$ in the measured heights, while the elastic region exhibits a higher and nearly constant ratio in the measured heights. The intermediate region is one of changing ratios. Thus, one may obtain measurements reflecting the ultimate tensile strength of the material and the yield point.

The foregoing mapping is possible because of the wide range of linearity of the linear variable differential transformer. This value is approximately 1000 to 1 in transformers having 0.100 inch and 0.250 inch ranges. Thus embodiments of the invention, in accurately measuring the bounce heights from a value on the order of .100 inch to those on the order of 0.0001 inch, can measure a wide range of point pressures.

In addition to facilitating the measuring of a wide range of point pressures, they can be used to measure the hardness of a surface while causing very minor damage to the surface. While typical drop heights are 0.050 inch, the equipment can, with a diameter of the indenter tip of 0.010 inch and a mass of one gram, exceed the stress required for full plastic flow in the hardest steel from a drop height of 0.025 cm. (0.010 inch) and the rebound height is readily measured. With this mode of operation the damage to a surface is miniscule, being barely detectable with the naked eye and of the same magnitude as flaws that statistically occur on conventional ground surfaces.

When the Shore hardness number is to be obtained it is usually desirable to use standard hardness blocks to calibrate the instrument in these terms. Calculated values in terms of the equipment are usually less accurate than the standards. Nevertheless, they are useful in interpolating between standards and in extrapolating beyond standards.

Although the invention has been described with respect to certain specific embodiments, it will be appreciated that various modifications and changes may be made by those skilled in the art without departing from the spirit and scope of the invention.

What we claim as new and desire to secure by Letters Patent of the United States is:

1. Apparatus for measuring mechanical properties of a material comprising:
   (a) a mechanical support member adapted to be placed on the surface of said material,
   (b) a linear variable differential transformer attached to said support member and producing a varying electrical output as the core thereof is displaced from null position in said transformer, said transformer having a characteristic range in which its output varies linearly with core displacement,
   (c) a pointed indenter affixed to said core member and arranged to be dropped to impact upon said material, said indenter having adequate mass and sharpness to deform a test material when dropped through a height less than said characteristic range and to rebound,
   (d) means for setting the drop height of said indenter at a value within said linear range.

2. The apparatus of claim 1 wherein said means for setting the drop height comprises a stop mechanically attached to said support member.

3. The apparatus of claim 1 wherein said means for setting the drop height comprises a stop mechanically attached to said support member and adjustable in height relative to the null position of said transformer.

4. The apparatus of claim 1 wherein said transformer attachment to said mechanical support member is adjustable for adjustment of the null position of said transformer relative to said surface.

5. The apparatus of claim 2 wherein said indenter has a magnetic member affixed thereto on an extension extending outside said transformer, and wherein said means for setting the drop height further comprises a solenoid arranged adjacent said magnetic member for suspending said indenter in engagement with said stop when energized and for releasing said indenter when de-energized.

6. The apparatus of claim 5 wherein said mechanical support member comprises three mutually supporting telescoping members, the outermost of which makes surface contact with said material; one of the inner two telescoping members supporting said solenoid; and the other of said inner two telescoping members supporting said differential transformer.

7. The apparatus of claim 6 wherein said outermost telescoping member is arranged on the lower extremity of said intermediate telescoping member and said intermediate telescoping member is apertured on the portion of its lateral surfaces extending beyond said outermost telescoping member to permit adjustive access to said innermost telescoping member.

8. The apparatus set forth in claim 7 wherein said telescoping members are generally cylindrical and are successively supported in mutually threaded engagement.

9. Apparatus as set forth in claim 1 having in addition thereto electrical sensing means coupled to the output of said transformer for measuring the height that the indenter rebounds.

10. Apparatus as set forth in claim 9 wherein said sensing means comprise a peak detector having a time constant long relative to the time between rebounds and wherein means are provided to discharge said peak detector prior to said first rebound maximum.

11. Apparatus as set forth in claim 10 wherein said discharging means comprises an envelope detector, coupled to the output of said transformer, a threshold device sensing null in said envelope and generating a triggering pulse approximately when the indenter makes first contact with said surface; a resettable bistable device for generating an output pulse in response to the first of said trigger pulses; a pulse responsive discharge element; and means coupling said output pulse to said discharge element to discharge said peak detector.

12. Apparatus as set forth in claim 10 wherein said discharge means comprises contact means operable at the time of release of said indenter to initiate a trigger pulse, a pulse generator responsive thereto and generating an output pulse whose duration approximates but is less than the time interval to the first rebound maximum, a discharge element responsive to the starting transient of said output pulse to discharge said peak detector, a gate interposed between said transformer output and said peak detector responsive to the trailing transient of said output pulse to open said gate and permit passage of the signal to the peak detector during the time that the first rebound is going through maximum.

13. Apparatus as in claim 12 wherein the duration of said output pulse is adjustable.

14. Apparatus as in claim 12 wherein a second pulse generator is provided, responsive to the trailing transient of said output pulse, and generating an output pulse of shorter duration in response thereto, which is coupled to said gate to open it during said duration, said shorter pulse being adjusted to start slightly before the maximum of said rebound and to terminate slightly thereafter.

References Cited

UNITED STATES PATENTS

| | | | |
|---|---|---|---|
| 2,780,101 | 2/1957 | Kinkel | 73—517 |
| 2,992,554 | 7/1961 | Stolk | 73—12 |

JAMES J. GILL, *Primary Examiner.*

HERBERT GOLDSTEIN, *Assistant Examiner.*

U.S. Cl. X.R.

73—79